United States Patent

Le Blevec et al.

Patent Number: 5,959,055
Date of Patent: Sep. 28, 1999

[54] ETHYLENE/POLYALKYLENEGLYCOL (ETHER) (METH)ACRYLIC ESTER COPOLYMER AND NONPOROUS BREATHABLE FILM OBTAINED THEREFROM

[75] Inventors: Jean-Marc Le Blevec, Seeres-Castet; Michel Degrand, Bernay, both of France

[73] Assignee: Elf Atochem S.A., Puteaux, France

[21] Appl. No.: 08/982,614

[22] Filed: Dec. 2, 1997

[30] Foreign Application Priority Data

Dec. 11, 1996 [FR] France ................... 96 15203

[51] Int. Cl.⁶ ................... C08F 20/26
[52] U.S. Cl. ................... 526/318.42; 526/320
[58] Field of Search ................... 526/318.42, 320

[56] References Cited

U.S. PATENT DOCUMENTS 3,494,904 2/1970 Waples, Jr. .
5,173,275 12/1992 Koehler et al. .
5,210,166 5/1993 Ziegler et al. .

FOREIGN PATENT DOCUMENTS 0538033 4/1993 European Pat. Off. .
A-61-042517 3/1986 Japan .

Primary Examiner—Bernard Lipman
Assistant Examiner—N. Sarofim
Attorney, Agent, or Firm—Pennie & Edmonds LLP

[57] ABSTRACT

An ethylene/polyalkyleneglycol(ether) (meth)acrylic ester copolymer and a nonporous breathable film obtained therefrom are provided, the polymer comprising the following monomer units:

(i) from 99 to 50% by weight ethylene;
(ii) from 1 to 50% by weight of a monomer of formula I $$CH_2=C(R_1)-COO-[C_mH_{2m}-O]_n-H \qquad (I)$$

in which R1 is H or $CH_3$, m is 2, 3 or 4; n is comprised between 2 and 25; and (iii) from 0 to 20% by weight of a third monomer;
said copolymer having a mean molecular weight comprised between 5,000 and 65,000.

21 Claims, No Drawings

ETHYLENE/POLYALKYLENEGLYCOL (ETHER) (METH)ACRYLIC ESTER COPOLYMER AND NONPOROUS BREATHABLE FILM OBTAINED THEREFROM

BACKGROUND OF THE INVENTION

The present invention relates to a novel ethylene/polyalkyleneglycol(ether) (meth)acrylic ester copolymer and a nonporous yet breathable film obtained therefrom.

Numerous nonporous yet breathable films are known; nevertheless they have poor permeability properties and poor mechanical strength. Moreover, most of these films are expensive.

There is thus a need for nonporous breathable films having improved permeability to gases, and of which the other properties are satisfactory, notably when the films are thin.

European patent application 0,538,033 discloses films which are copolymers of ethylene and hydroxy acrylate, the latter representing from 7 to 30% by weight. The hydroxy acrylate is for example hydroxyethylmethacrylate (HEMA). This polymer can be obtained in the form of films, and it is indicated that such films can be employed in applications requiring good water vapor permeability. However, the values for water vapor permeability given in the examples are relatively low, i.e. distinctly below the permeability needed for a nonporous yet breathable film application.

U.S. Pat. No. 3,494,904 discloses copolymers that are obtained from ethylene and esters of (meth)acrylic acid and polyalkyleneglycol ether. In these copolymers, the polyalkyleneglycol ether comprises an alkylenoxy group containing 2 or 3 carbon atoms, and a terminal alkoxy group comprising 1 to 4 carbon atoms. The copolymers are for example obtained by radical catalysis carried out in an autoclave. In these copolymers, the ester monomer of polyalkyleneglycol ether represents from 1 to 37% by weight. The copolymers have a mean molecular weight comprised between 20,000 and 65,000 and are used as such for heat-shrinkable films. There is no mention of water vapor permeability of such films.

JP-A-61042517 discloses an additive for improving the flow point of fuel oil, this additive being a copolymer of ethylene, of butene and polyalkyleneglycol (meth)acrylic ester, the latter making up from 1 to 200% by weight of the final polymer. These copolymers have a mean molecular weight of about 2,500, meaning that such polymers are not suitable for transformation into films.

None of these documents teaches nonporous breathable film, in other words film which is permeable to water vapor but impermeable to water, based on an ethylene/polyalkyleneglycol (ether) (meth)acrylate copolymer. None of these documents thus either teaches or suggests the present invention.

SUMMARY OF THE INVENTION

Thus the invention provides a copolymer comprising the following monomer units:

(i) from 99 to 50% by weight ethylene;
(ii) from 1 to 50% by weight of a monomer of formula I

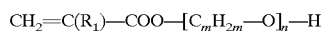   (I)

in which:
R1 is H or $CH_3$
m is an integer equal to 2, 3 or 4;
n is a real number comprised between 2 and 25; and
(iii) from 0 to 20% by weight of a third monomer;
said copolymer having a mean molecular weight comprised between 5,000 and 65,000.

The invention also relates to a nonporous (yet) breathable film and an antistatic object obtained from the above copolymer according to the invention.

The invention further provides a nonporous (yet) breathable film obtained from a copolymer comprising the following monomer units:

(i) from 99 to 500% by weight ethylene;
(ii) from 1 to 50% by weight of a monomer of formula II

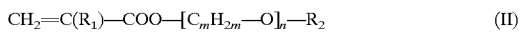   (II)

in which:
$R_1$ is H or $CH_3$
m is an integer equal to 2, 3 or 4;
n is a real number comprised between 2 and 25;
$R_2$ is an alkyl group having from 1 to 4 carbon atoms; and
(iii) from 0 to 20% by weight of a third monomer;
said copolymer having a mean molecular weight comprised between 5,000 and 65,000.

The copolymer cited immediately above can also be employed for producing an antistatic object.

The molecular weight is a mean molecular weight by number (MWn), such as measured by GPC (gel permeation chromatography).

The formula $C_mH_{2m}$ in which m is 2, 3, or 4 cover the ethylene, n- and iso-propylene, n-, iso- and tert-butylene groups, in all stereochemical configurations.

In the formulae I and II above, the preferred conditions are:
m is 2;
$R_1$ is $CH_3$.
n is comprised preferably between 5 and 20.

In a preferred embodiment, the mean molecular weight of the copolymers is preferably comprised between 10,000 and 25,000.

In a preferred embodiment, melt index MI is comprised between 0.5 and 100, preferably comprised between 1 and 10. Such values are suitable for producing films.

MI is melt flow index, measured at 190° C. under 2.16 kg, and is expressed in g/10 min.

According to another embodiment, the copolymers comprise:

(i) from 90 to 60% by weight ethylene;
(ii) from 10 to 40% by weight of a monomer of formula I or II; and
(iii) from 0 to 10% by weight of a third monomer.

DETAILED DESCRIPTION OF PREFERRED EMBODIMENTS

The invention will now be described in more detail below.

Ethylene is a monomer available in large amounts.

The polyethyleneglycol (ether) (meth)acrylic ester monomers of formulae I or II are commercially available or can be prepared by any conventional process. Monomers of formula I are for example marketed by Nippon Oil under the tradename Blemmer®. U.S. Pat. No. 3,494,904 gives examples of such monomers of formula II. The variation in the number n is obtained by suitably blending the starting alkylenoxy groups. Blends of such monomers are also possible, i.e. blends of monomers of formula I, blends of monomers of formula II as well as blends of monomers of formula I and formula II.

For the third monomer, any third monomer conventionally used in the art can be employed. Examples of such third monomers are: an alpha-olefin having at least 3 carbon atoms with one or several unsaturation(s); a styrene monomer; salts or esters of unsaturated carboxylic acids such as alkyl (meth) acrylate; vinyl esters of saturated carboxylic acids such as vinyl acetate; maleic anhydride and unsaturated epoxides, notably when there are only monomers of formula II.

The present copolymers can be prepared by any conventional process in the art. For example, high pressure radical synthesis in an autoclave, as described in U.S. Pat. No. 3,494,904 can be cited, with a peroxide as initiator. Other methods of synthesis can however be employed, such as for example, in a high-pressure radical reactor.

Copolymer blends are also possible in the framework of the invention.

These polyalkyleneglycol (ether) (meth)acrylic ester copolymers have the characteristic of being impermeable to water but permeable to water vapor, the polyalkyleneglycol (ether) being designated as "hydrophilic", in line with the skilled person's conventional acceptation. The present copolymers also have adhesion characteristics, in particular on PET.

These copolymers can also be blended with conventional additives.

Films obtained from copolymers according to the invention are nonporous yet breathable, in other words permeable to water vapor but impermeable to water, and, generally speaking, permeable to gasses but impermeable to liquids. Such films can be prepared using any process known in the art, for example extrusion. These films have a thickness comprised, for example, between 5 and 500 μm, preferably between 10 and 250 μm. The films can be associated with other films and/or supports.

The films according to the invention are suitable for many fields of application, for example:

single-layer or multi-layer films (for example, in association with a dry EVOH film or a PET film or support);

plastics for adhesion, coextruded with plastics materials, notably polar ones;

products having improved thermal and high frequency weldability;

products for printing with water-soluble inks;

antistatic products.

The films according to the invention are thus suitable for applications as varied as the field of hygiene, medicine, protective clothing, roof underlay and food packaging, for example for fruit and vegetables, notably freshly harvested fruit and vegetables.

The following examples illustrate the invention without limiting it.

EXAMPLE

In these examples, ethylene and a Blemmer® PE90 or PE350 monomer from Nippon Oil of the following respective formulae, were used:

| | | |
|---|---|---|
| $CH_2=C(CH_3)-COO-[CH_2-CH_2-O]_n-H$ | n = 2.9 | PE 90 |
| $CH_2=C(CH_3)-COO-[CH_2-CH_2-O]_n-H$ | n = 11.7 | PE 350 |

The Blemmer® monomer is introduced into the reactor in solution in toluene, the ethylene being introduced in the gaseous state under pressure. The reaction is carried out in the presence of a peroxide such as tertiobutyl perbenzoate or tertiobutyl perpivalate, at, for example, a concentration of 40 to 200 ppm. Reaction temperature is comprised between 165 and 235° C., the pressure being comprised between 1800 and 2000 bar. Comonomer entry rates are adjusted to obtain the weight composition being sought for the final copolymer. Melt flow index MI was measured at 190° C., and is expressed in g/10 min; molecular weight MW being given as mean weight by number (MWn) and is expressed in g, measured by GPC (gel permeation chromatography).

The result are given in table 1 below.

TABLE 1

| Ex. | type of comonomer | comonomer content (% by weight) | MI (190° C. g/10 min) | MW (g) |
|---|---|---|---|---|
| 1 | PE 90 | 25–30 | 84 | 10,000 |
| 2 | PE 90 | 20–25 | 35 | 14,000 |
| 3 | PE 90 | 20–25 | 22 | 16,000 |
| 4 | PE 90 | 20–25 | 2.7 | 22,000 |
| 5 | PE 90 | 10 | 4 | 18,000 |
| 6 | PE 350 | 20 | 3 | 21,000 |

The polymer obtained was then extruded through a flat die into the form of films, and water vapor permeability was measured in line with ASTM 96 E (38° C., 90%RH) and ASTM 96 BW (38° C., 50%RH). Permeability is expressed in grams per m2 and per day (d/m2/d). Oxygen permeability is also determined (21° C., 0%RH, Oxtran 1000 measuring apparatus), expressed in cc per m2 per day and unit of pressure (cc/m2/d/atm).

The results are given in table 2 below, the thickness being given in μm between brackets.

TABLE 2

| Ex. | water vapor permeability (g/m2/d) ASTM BW | water vapor permeability (g/m2/d) ASTM E | oxygen permeability (cc/m2/d/atm) |
|---|---|---|---|
| 1 | 194 (96) | nd | nd |
| 5 | 121 (122) | nd | nd |
| 6 | 2141 (133) | 728 (126) | 1710 (123) |
| 6 (a) | 10000 (25) | 2700 (25) | 8500 (25) | nd: not determined
(a) obtained by interpolation

This results show that the present copolymers lead to nonporous breathable films having, additionally, excellent oxygen permeability.

Obviously, this present invention is not limited to the embodiments indicated but may undergo numerous variations accessible to those skilled in the art.

What is claimed is:

1. A copolymer comprising the following monomer units:
(i) from 99 to 50% by weight ethylene;
(ii) from 1 to 50% by weight of a monomer of formula I

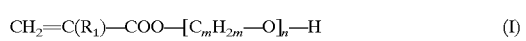

in which:
R₁ is H or CH₃
m is an integer equal to 2, 3 or 4;
n is a real number comprised between 2 and 25; and
(iii) from 0 to 20% by weight of a third monomer;
said copolymer having a mean molecular weight comprised between 5,000 and 65,000.

2. The copolymer according to claim 1, in which in formula of monomer (ii), m is equal to 2.

3. The copolymer according to claim 1, in which in the formula of monomer (ii), R₁ is CH₃.

4. The copolymer according to claim 1, in which in the formula of monomer (ii), n is comprised preferably between 5 and 20.

5. The copolymer according to claim 1, having a mean molecular weight comprised between 10,000 and 25,000.

6. The copolymer according to claim 1, having a melt index MI comprised between 0.5 and 100, preferably comprised between 1 and 10.

7. The copolymer according to claim 1, comprising:
(i) from 90 to 60% by weight ethylene;
(ii) from 10 to 40% by weight of a monomer of formula I; and
(iii) from 0 to 10% by weight of a third monomer.

8. The copolymer according to claim 1, in which in the formula of monomer (ii), m is equal to 2 and R₁ is CH₃.

9. The copolymer according to claim 8, having a mean molecular weight comprised between 10,000 and 25,000 and having a melt index MI comprised between 0.5 and 100, preferably comprised between 1 and 10.

10. The copolymer according to claim 8, comprising:
(i) from 90 to 60% by weight ethylene;
(ii) from 10 to 40% by weight of a monomer of formula I; and
(iii) from 0 to 10% by weight of a third monomer.

11. A copolymer comprising the following monomer units:
(i) from 90 to 60% by weight ethylene;
(ii) from 10 to 40% by weight of a monomer of formula I

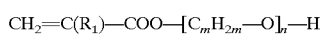  (I)

in which:
R₁ is CH₃
m is equal to 2;
n is a real number comprised between 2 and 25; and
(iii) from 0 to 10% by weight of a third monomer;
said copolymer having a mean molecular weight comprised between 10,000 and 25,000 and having a melt index MI comprised between 1 and 10.

12. A nonporous breathable film obtained from the copolymer according to claim 1.

13. A nonporous breathable film obtained from the copolymer according to claim 8.

14. A nonporous breathable film obtained from the copolymer according to claim 11.

15. An antistatic object obtained from the copolymer according to claim 1.

16. A nonporous breathable film obtained from a copolymer comprising the following monomer units:
(i) from 99 to 50% by weight ethylene;
(ii) from 1 to 50% by weight of a monomer of formula II

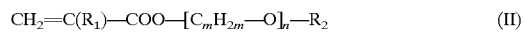  (II)

in which:
R₁ is H or CH₃
m is an integer equal to 2, 3 or 4;
n is a real number comprised between 2 and 25;
R₂ is an alkyl group having from 1 to 4 carbon atoms; and
(iii) from 0 to 20% by weight of a third monomer;
said copolymer having a mean molecular weight comprised between 5,000 and 65,000.

17. The nonporous breathable film according to claim 16, obtained from a copolymer in which in the formula of monomer (ii), m is equal to 2.

18. The nonporous breathable film according to claim 16, obtained from a copolymer in which in the formula of monomer (ii), R₁ is CH₃.

19. The nonporous breathable film according to claim 16, obtained from a copolymer having a mean molecular weight comprised between 10,000 and 25,000.

20. The nonporous breathable film according to claim 19, obtained from a copolymer having a melt index MI comprised between 0.5 and 100, preferably comprised between 1 and 10.

21. The nonporous breathable film according to claim 16, obtained from a copolymer comprising:
(i) from 90 to 60% by weight ethylene;
(ii) from 10 to 40% by weight of a monomer of formula II; and
(iii) from 0 to 10% by weight of a third monomer.

* * * * *